(Model.)

B. C. WILSON.
COUPLING ATTACHMENT FOR SMOOTH END PIPES.

No. 250,698. Patented Dec. 13, 1881.

WITNESSES:
Hen. McCombs
Albert Lufton

INVENTOR
Bennet C. Wilson

UNITED STATES PATENT OFFICE.

BENNET C. WILSON, OF PHILADELPHIA, PENNSYLVANIA.

COUPLING ATTACHMENT FOR SMOOTH-END PIPES.

SPECIFICATION forming part of Letters Patent No. 250,698, dated December 13, 188 .

Application filed March 30, 1881. (Model.)

*To all whom it may concern:*

Be it known that I, BENNET C. WILSON, a citizen of the United States, resident of the city and county of Philadelphia, in the State of Pennsylvania, have invented certain new and useful Improvements in Coupling Attachments for Smooth-End Pipes, of which the following is a specification, reference being had to the accompanying drawings, wherein—

Figure 1:
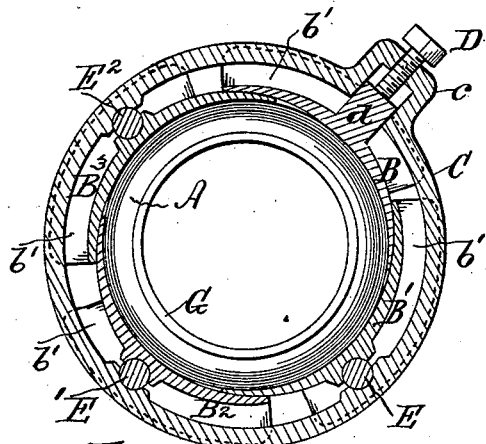
Figure 2:
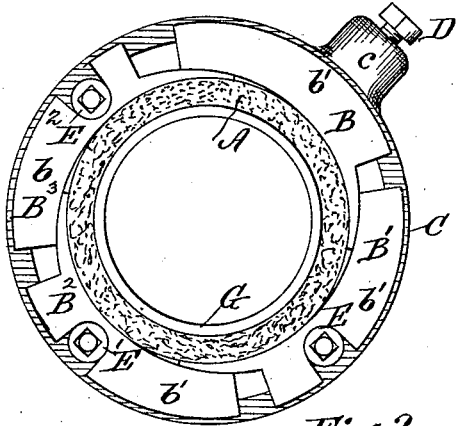
Figure 3:
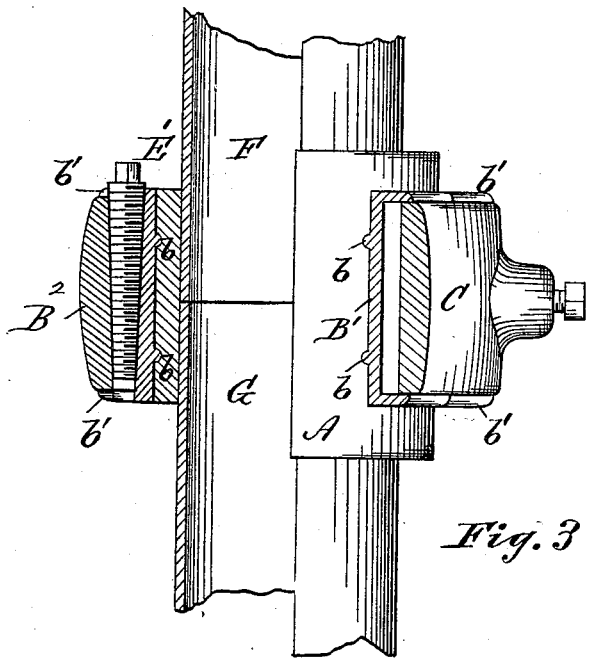

Figure 1 is a vertical longitudinal section of my improved coupling attachment. Fig. 2 is a front elevation of the same; and Fig. 3 is a side elevation, partly in section, illustrating the application of my invention.

My invention has for its object to provide a coupling attachment for pipes having smooth ends; and my invention consists in the novel combination, construction, and arrangement of parts, having reference principally to the provision of a section of a rubber tube or hose forming a union, of surrounding metallic lapping end clamps inclosed in a ring, and suitable screw mechanism for adjusting said clamps, and applying pressure thereto to secure the coupling attachment in position upon the pipe ends, and to form a water-tight connection therefor.

Referring to the accompanying drawings, A represents a section of a hose or other elastic tubing, which is designed to be placed over the joint formed by the juxtaposition of smooth pipe ends.

B B' B² B³ are a series of metal clamps, their ends lapping each other, as shown, and formed with ridges or ribs $b\ b$.

C is a metal ring surrounding said clamps, and forms a support for the flanges $b'\ b'$ of said clamps, whereby the latter are held thereon in a suitable position. The ring C is formed with a nib or projection, $c$, through which passes screw D, the end of said screw impinging against a projection, $d$, formed on the clamp B.

E E' E² are conical or tapering screws, having threaded bearings in the ring $c$ and in the metal clamps B' B² B³, respectively, whereby said clamps are adjusted and pressure applied thereto when the coupling is secured in position.

The operation is as follows: The pipes F and G having their ends placed together and the union A slipped over the joint formed between said pipes, the coupling attachment being fixed in position, the screws D, E, E', and E² are turned, the clamps are thereby forced in upon the union or gum-hose connection A, pressing the same tightly against said pipes at all points to form a water-tight joint. The more the screws are turned the tighter said joint will become, and when fully formed the coupling is rigidly fixed in position, and cannot be loosened or uncoupled except by reversely turning said screws.

If desired, instead of using the tapering screws for the clamps B' B² B³, screws like D may be used, passing through the ring C; but where the taper-screws are used a nearly smooth or uninterrupted outer surface is procured for the ring C, and the latter is more conveniently handled than it would be were a series of lugs formed thereon. So too, if desired, the ring C may be in two sections connected by adjusting-screws, so that the diameter of said ring may be extended or contracted to suit different sizes of pipes.

What I claim as my invention is—

1. In combination with an elastic hose section or union, A, the metallic clamps B B' B² B³, having overlapping ends and provided with flanges $b'\ b'$ resting upon ring C, and screw mechanism for adjusting said clamps to exert a pressure on said union A, substantially as shown and described.

2. In a coupling attachment for smooth-end pipes, consisting of an elastic union surrounding flanged metallic clamps, the ends of which overlap each other, a ring embracing or containing said clamps, the flanges of the latter resting on the edges of said ring, and screw mechanism between said ring and clamps, substantially as shown, and for the purpose set forth.

In testimony that I have claimed the foregoing I have hereunto set my hand this 26th day of March, 1881.

BENNET C. WILSON.

Witnesses:
CHAS. C. SCHERF,
ALBERT LUPTON.